(12) United States Patent
Bienas et al.

(10) Patent No.: US 10,771,953 B2
(45) Date of Patent: Sep. 8, 2020

(54) SELECTION OF COMMUNICATION PARTNERS USING LOCATION AND VELOCITY INFORMATION

(71) Applicant: IPCom GmbH & Co. KG, Pullach (DE)

(72) Inventors: Maik Bienas, Schoeppenstedt (DE); Andreas Schmidt, Braunschweig (DE); Martin Hans, Bad Salzdetfurth (DE); Achim Luft, Braunschweig (DE)

(73) Assignee: IPCom GmbH & Co. KG, Pullach (DE)

( * ) Notice: Subject to any disclaimer, the term of this patent is extended or adjusted under 35 U.S.C. 154(b) by 0 days.

(21) Appl. No.: 15/549,796

(22) PCT Filed: Mar. 3, 2016

(86) PCT No.: PCT/EP2016/054555
§ 371 (c)(1),
(2) Date: Aug. 9, 2017

(87) PCT Pub. No.: WO2016/139309
PCT Pub. Date: Sep. 9, 2016

(65) Prior Publication Data
US 2018/0077556 A1 Mar. 15, 2018

(30) Foreign Application Priority Data
Mar. 4, 2015 (EP) ..................... 15157611

(51) Int. Cl.
*H04W 8/00* (2009.01)
*H04W 76/14* (2018.01)
(Continued)

(52) U.S. Cl.
CPC ........... *H04W 8/005* (2013.01); *H04W 76/14* (2018.02); *H04W 64/006* (2013.01);
(Continued)

(58) Field of Classification Search
None
See application file for complete search history.

(56) References Cited

U.S. PATENT DOCUMENTS

| 5,519,760 A | 5/1996 | Borkowski et al. |
| 8,731,087 B2 | 5/2014 | Yuan et al. |

(Continued)

FOREIGN PATENT DOCUMENTS

| CN | 103974431 A | 8/2014 |
| EP | 1111811 A2 | 6/2001 |

(Continued)

OTHER PUBLICATIONS

International Search Report for PCT/EP2016/054555, dated May 3, 2016.

(Continued)

*Primary Examiner* — Kibrom T Hailu
(74) *Attorney, Agent, or Firm* — Marshall, Gerstein & Borun LLP

(57) ABSTRACT

The present invention provides a method for selecting a transmission mode for a transmission to at least one further user equipment, by selecting a communication profile for communication with the at least one further user equipment out of a set of provided communication profiles as a function of at least one determined location property, wherein each communication profile defines a set of transmission parameters.

22 Claims, 6 Drawing Sheets

(51) Int. Cl.
*H04W 64/00* (2009.01)
*H04W 84/00* (2009.01)
*H04W 84/18* (2009.01)
*H04W 76/40* (2018.01)
*H04W 88/06* (2009.01)

(52) U.S. Cl.
CPC .......... *H04W 76/40* (2018.02); *H04W 84/005* (2013.01); *H04W 84/18* (2013.01); *H04W 88/06* (2013.01)

(56) References Cited

U.S. PATENT DOCUMENTS

| | | | | |
|---|---|---|---|---|
| 9,986,422 | B2* | 5/2018 | Altintas | H04W 28/18 |
| 2002/0034959 | A1* | 3/2002 | Jamieson | H04L 12/12 |
| | | | | 455/517 |
| 2005/0239438 | A1* | 10/2005 | Naghian | H04W 12/02 |
| | | | | 455/410 |
| 2007/0297341 | A1* | 12/2007 | Chiu | H04L 67/327 |
| | | | | 370/252 |
| 2012/0329473 | A1* | 12/2012 | Ekbatani | H04W 76/14 |
| | | | | 455/456.1 |
| 2013/0013181 | A1* | 1/2013 | Wang | G08G 1/096791 |
| | | | | 701/119 |
| 2013/0065538 | A1* | 3/2013 | Kim | H04W 76/10 |
| | | | | 455/68 |
| 2013/0077527 | A1* | 3/2013 | Walley | H04W 84/18 |
| | | | | 370/254 |
| 2013/0159537 | A1 | 6/2013 | Kwon et al. | |
| 2013/0297703 | A1* | 11/2013 | Van Ackere | H04L 67/104 |
| | | | | 709/204 |
| 2014/0134999 | A1 | 5/2014 | Scheessele et al. | |
| 2014/0177564 | A1* | 6/2014 | Ma | H04W 74/04 |
| | | | | 370/329 |
| 2015/0092661 | A1* | 4/2015 | Huang | H04W 40/026 |
| | | | | 370/315 |
| 2015/0141021 | A1* | 5/2015 | Kapoulas | H04W 36/32 |
| | | | | 455/441 |
| 2015/0341773 | A1* | 11/2015 | Ribeiro | H04W 8/005 |
| | | | | 370/329 |
| 2015/0351076 | A1* | 12/2015 | Pais | H04W 76/14 |
| | | | | 370/312 |
| 2015/0373719 | A1* | 12/2015 | Xu | H04W 76/14 |
| | | | | 370/329 |
| 2017/0054694 | A1* | 2/2017 | Fujikami | H04L 9/08 |
| 2017/0324511 | A1* | 11/2017 | Moosavi | H04L 1/0046 |

FOREIGN PATENT DOCUMENTS

| | | |
|---|---|---|
| KR | 20100087427 A | 8/2010 |
| WO | WO-2007082251 A1 | 7/2007 |
| WO | WO-2013089527 A1 | 6/2013 |
| WO | WO-2013169225 A1 | 11/2013 |
| WO | WO-2014098906 A1 | 6/2014 |
| WO | WO-2014115951 A1 | 7/2014 |
| WO | WO-2014116083 A1 | 7/2014 |

OTHER PUBLICATIONS

Chen K, et al., Cross-Layer Design for Data Accessibility in Mobile Ad Hoc Networks, Wireless Personal Communications, Springer, Dordrecht, NL, vol. 21, No. 1, Apr. 1, 2002, pp. 49-76, XP001115424, ISSN: 0929-6212.

Taleb T., et al., An Efficient Vehicle-Heading Based Routing Protocol for Vanet Networks, Wireless Communications and Networking Conference, 2006. WCNC 2006., IE EE Las Vegas, NV Apr. 3-6, 2006, pp. 2199-2204, XP031387534.

Vinod Namboodiri, et al., Prediction-Based Routing for Vehicular Ad Hoc Networks, IEEE Transactions on Vehicular Technology, IEEE Service Center, Piscataway, NJ, vol. 56, No. 4, Jul. 1, 2007, pp. 2332-2345, XP011187986.

European Patent Office, Office Action for Application No. 16 707 787.4, dated Jan. 29, 2019.

European Patent Office, Summons to attend oral proceedings for Application No. 16707787.4, dated Mar. 6, 2020.

Russian Patent Office, Office Action for Application No. 2018134917/07(057431), dated Sep. 9, 2019.

* cited by examiner

SELECTION OF COMMUNICATION PARTNERS USING LOCATION AND VELOCITY INFORMATION

CROSS-REFERENCE TO RELATED APPLICATIONS

This is the United States national phase of International Patent Application No. PCT/EP2016/054555, filed Mar. 3, 2016, which claims the benefit of priority of EP 15157611.3, filed Mar. 4, 2015, the entire contents of both of which are hereby incorporated herein by reference.

FIELD OF THE DISCLOSURE

The present invention relates to user equipment location information and the use of such information for establishing a connection using optimal transmission parameters or for a decision not to establish a connection. Furthermore, transmission parameters of already established connections can be optimized under consideration of the provided location information for an optimal quality-of-service provision being tailored to the specific communication situation.

BACKGROUND

EP 1 1 11 811 A2 discloses a method of communicating between a first mobile communication unit and a second communication unit comprising the steps of determining a velocity vector of a mobile communication, calculating a Doppler profile using a velocity and afterwards using the Doppler profile for communication between the mobile communication unit and a second communication unit. WO 2013/16 9 22 5 A1 teaches a repeater comprising a processor configured to determine a corrective frequency shift for a signal based on a velocity of the repeater relative to a source of the signal and a representative transmission frequency.

U.S. Pat. No. 8,731,087 B2 discloses a method comprising selecting a transmission mode for an uplink transmission from a mobile device, having multiple antennas, to a base station having also multiple antennas and selecting the transmission mode as a function of a device speed.

WO 2014/11 60 83 A1 provides a method and apparatus for performing a device-to-device, D2D, communication by a user equipment and supporting D2D communication by a communication entity.

WO 2014/1 15951 A1 is directed towards a method in an apparatus for use in a wireless communication system and is specifically directed towards a method of performing a discovery procedure for a ProSe and an apparatus therefore, in which scanning of one or more wireless local area network access points is performed.

U.S. Pat. No. 5,519,760 A1 teaches several approaches for determining the location of an end device in a cellular network based system.

In a paper by Kai Chen et al. entitled "Cross-Layer Design for Data Accessibility in Mobile Ad Hoc Networks", Wireless Personal Communications, Vol. 21, 49-76, 2002, a mobile ad hoc network, MANET, is described having an application layer that produces and shares multimedia data with other users in the network, a middleware layer that runs a data accessibility service and a routing layer that computes feasible routes and forwards packets to other mobile nodes in the network. The routing layer makes use of data including location information advertised by other nodes in the network.

US 2014/0134999 A1 describes an arrangement in which a first mobile device requests location information about a second mobile device using a cellular connection and from received location information determines whether a connection to the second device should be made using the cellular network or an ad hoc WLAN connection. A further mobile ad hoc network is described by Tank Taleb et al. in the proceedings of the Wireless Communications and Networking Conference 2006, 2199-2204.

Known methods describe a communication between user equipment, the so-called device-to-device communication. This type of communication has very specific features such as the transmission range is smaller compared to a cellular communication with a base station and furthermore both communication devices are not location static. Hence, the time period for establishing a connection between both devices is potentially of short duration and connecting may not be feasible at all because both end devices depart from each other. In case more than two end devices are communicating with each other it may be useful to establish a so-called ad-hoc network instead of establishing several one-to-one connections between two respective end devices. In such a network end devices may be enabled to communicate with each other in a direct device-to-device manner as well as a multicast or broadcast mode. The establishment of such an ad-hoc network and the management of incoming and outgoing devices, comprising registering and subscription of devices as well as freeing location of unregistered devices results in an increased effort for exchanging signalling information and workload for involved end devices.

Known methods do not provide satisfying decision techniques based on a suitable amount of well-chosen criteria for determining whether a potential establishment of a connection is promising regarding the provision of a requested service and in case such a connection is to be set up, which communication mode is to be applied. It needs to be determined whether a one-to-one connection or an ad-hoc network is suitable in that very specific situation. According to known techniques connections are established even if a connection duration is very limited which brings about extensive effort regarding the signalling. Such an unbalanced effort of providing control information instead of payload can be disproportional for a specific communication situation. Furthermore, according to known methods, the selection of the transmission mode and the adaption of transmission parameters towards the features of the transmission channel typically take place after the connection is already established. This leads to a waste of useful transmission resources and furthermore to increased energy consumption which could be avoided. Hence, there is a need to provide an improved method regarding signalling optimization for establishing device-to-device connections or an ad-hoc network and for management of subscriptions of end devices in an already established ad-hoc network.

GENERAL DESCRIPTION

It is therefore an object of the present invention to provide a user equipment and a respective method for operating the user equipment for selection of an appropriate transmission mode, which consider the movement of respective communication partners. In case the establishment of a connection is not target leading regarding the provision of a requested service the connection attempt needs to be cancelled immediately.

The present invention is directed towards a user equipment being arranged to detect location information, such as a velocity of a further user equipment, and determine an appropriate transmission mode for communicating with the further user equipment based on the measured location properties. The user equipment provides means for estimating location parameters, which are applied for establishing a connection according to optimal transmission parameters. Furthermore, transmission parameters of already established connections can be optimized under consideration of the provided location information for an optimal quality-of-service provision being tailored to the specific communication situation. Furthermore, a respective method for operating the user equipment is provided.

Accordingly a user equipment for selection of a transmission mode as a function of at least one location property to a further user equipment is suggested. The user equipment comprises a measurement device being arranged to select a communication profile of at least one further user equipment out of provided communication profiles as a function of at least one detected location property, wherein each communication profile defines a set of transmission parameters. The provided user equipment furthermore comprises a transmission device being arranged to establish a connection to the at least one further user equipment in accordance with the selected communication profile in case the respective transmission parameters allow a provision of a requested service.

The present invention also provides a user equipment which requests a service for instance from a further user equipment and needs to identify a transmission mode which is appropriate for communication with that further user device. As user equipment freely move from one location to another the method for operation of such user equipment needs to identify whether a device-to-device transmission mode is the most appropriate for mutual communication or if an infrastructure mode needs to be established. As the involved end devices are not location static they may only meet for a very limited period of time. For avoidance of an unnecessary establishment of connections to each user device in close proximity the movement behaviour and respective capabilities of user devices as potential communication partners have to be evaluated. Furthermore, such a transmission mode has to be selected under consideration of features of the requested service. In case a first user equipment requests to start a long period gaming session a stable connection over a long period is required. In case the first user equipment requests traffic information it may be of advantage to select a broadcast to a variety of end devices.

As developments are made in the increasing automation of automobiles, for example, developments in the area of cellular communication have been considered, whereby user equipment transmit particular information relating to the traffic situation they are experiencing to a central server to improve traffic routing.

Traffic information is typically transmitted by means of only a few bursts in comparison to larger data amounts being required for video streaming services. The traffic information needs to be received by a variety of user devices and can therefore be broadcast to each user device for instance moving in a certain direction. In case the end user device is installed in a car, for instance by means of a navigation system, the navigation system can transmit the location property of a specific movement direction. In case a user equipment provides traffic information it can therefore use the direction of the movement and establish only a stable connection to those cars travelling in a specific highway direction on which an accident happened. Those cars moving in the opposite direction also indicate their direction by a location property but as their profile is not a targeted profile no connection will be established to these cars and therefore no broadcast traffic information is delivered to them.

Each measurement device being comprised by a user equipment is connectively coupled to a data storage providing communication profiles. This may be static communication profiles specifying certain capabilities of end devices, such as the capability of outputting audio information. It may the case that such a communication profile is adapted dynamically at runtime, for instance as a function of a requested service. Hence, the communication profile may indicate that a specific service is only to be provided for a specific group of user devices. As mentioned above the communication profile may indicate a movement direction which can be updated in case an accident does no longer affect the traffic flow on a highway. Hence, the location property is changed and further traffic information is broadcast to navigation systems travelling in any direction. For instance a weather forecast is broadcast to end devices being in close proximity to a weather information system without further consideration of a movement direction.

It is advantageous to consider further properties in combination with at least one location property. In case the requested service is of high priority, such a priority information or priority class, can be considered when selecting a communication profile. In case of an emergency alert the user equipment can be configured such that transmission parameters of a selected communication profile are not considered and an establishment of a connection is at least tried although the communication conditions are inappropriate. Hence, the evaluation of transmission parameters, which have been selected along with a communication profile, are not considered and even if there is only a low chance of allowing a provision of a requested service connection attempts are still accomplished.

Alternatively, a requested service may demand only optimal transmission parameters, which can be evaluated as well. In case such high requirements are not met the user equipment decides not to establish a connection and request the service from another user equipment. In this way no connection is established in case quality-of-service parameters are not met.

For evaluation if specific transmission parameters allow a provision of a requested service it may be required to define a service profile with respective transmission parameters. Hence, the transmission parameters of the communication profile can be compared with the requirements profile of the respective service and furthermore a decision can be made as a function of the comparison results if the respective transmission parameters of the communication profile allow a provision of a requested service. Such a requirement profile of a requested service can for instance specify a specific bandwidth which needs to be provided for a specific service. For instance in case of a requested video streaming service a high bandwidth is to be specified in the respective requirements profile of the service and in case such transmission parameters are not available a connection will not be established. As video streaming requires the provision of the service for a longer period of time such requirement profiles may also indicate a duration indicating how long such a connection can presumably be established. In case a video streaming of five minutes is requested but a stable connection can only be provided for several seconds the transmission device decides not to establish a connection and demand such a service from further end devices.

For selecting a specific communication profile the measurement device may determine a location property of a further user equipment and compare the location property with information provided in the communication profile such as a movement direction. Hence, the communication profile may describe a set of location properties which are to be matched with detected location properties. For instance such a location property being stored in the communication profile may be defined by a proximity of a specific number of meters around the present location of the requesting user equipment. It is furthermore of advantage to derive further information from a set of location properties being detected such as a movement away from the requesting user equipment. Hence, the communication profile may indicate that only a short duration regarding a potential connection can be granted. In case location properties are detected, which indicate that a specific user equipment is moving away from the requesting user equipment the communication profile may demand for transmission parameters, which establish a connection to the away moving user equipment in an efficient way as the user equipment providing a requested service will not be available after the estimated duration.

In case location properties indicate that a service requesting user equipment and a service providing user equipment are in close proximity and are location static for a specific period of time a communication profile may be selected, which grants a high bandwidth even for a longer period of time. Hence, a stable connection over a longer period of time can be granted and transmission parameters focus on the quality of service instead of fostering a quick connection. The transmission parameters may also define a relation between control information and pay load. In case a stable connection can only be provided for several seconds the respective signalling information needs to be reduced for the sake of providing as much of the payload data as possible. In case a stable condition is reached a connection requiring extensive signalling information can be established.

As specific situations occur over and over again sets of transmission parameters can be summarized in specific communication profiles. Hence, it is possible to define communication profiles a priori to the establishment of a connection and afterwards apply said communication profiles in a straight forwarded way. Hence, the processing time is reduced as detected location properties can be evaluated easily by means of predefined communication profiles. This provides the advantage that even large amounts of detected location properties can be processed easily as they correspond to at least one communication profile. It may be required to calculate a specific matching value between a set of detected location properties and a communication profile. Hence, such a value can be used for selection of a specific communication profile out of the provided several communication profiles. Typically, the highest matching value of a communication profile suggests this specific communication profile for its further usage.

Although the transmission device is arranged to establish a connection to one further user equipment it may also be of advantage that connections to several user equipment are established. The requested service may for instance be provided by several further user equipment. For instance a requested service needs to be provided over a longer period of time said service may be split and provided by several further user equipment. In case only connections of short duration are available the requesting device may establish a connection to a first user equipment, which provides a first part of the requested service. Before the end of the established connection the requesting user equipment may identify a further second user equipment, which is able to provide a second part of the requested service. Hence, the requesting user equipment receives the first part of the requested service from the first user equipment and establishes a second connection to a second service providing user equipment and receives the second part of the requested service from the second user equipment. In this way a handover from service providing end devices is accomplished, which jointly provide the requested service. Such connection data may be specified in the communication profile, which indicates that after a certain duration a further connection to a further service providing device needs to be established. It is therefore possible to provide a video streaming service on a device-to-device basis under usage of several streaming providing end devices. In this way services can be provided in a direct communication mode without the necessity for a central and intermediate service broker. In case no appropriate service providing end device is detected it may also be of advantage to deny the establishment of a connection and monitor approaching end devices by measuring their location properties. In case an appropriate end device reaches the proximity of the service requesting user equipment it can be evaluated if the approaching end device is able to provide the requested service or at least provide the requested service in part.

Hence, it is an aspect of the present invention to categorize potential communication partners with regard to the relative velocity to each other, for instance by means of a first category, also referred to as communication profile, holding devices moving in the same direction as the requesting device, a second category holding devices moving in the opposite direction of the requesting device and a third category with location static devices. This categorization can be used for a decision regarding an establishment of a one-to-one connection between end devices and furthermore for a decision whether specific end devices are not appropriate for providing a specific service or furthermore a decision regarding the establishment of an ad-hoc network.

The categorization can be accomplished at least according to the following three approaches.

Firstly, this can be accomplished by measuring the relative velocity. A relative change of location between a sender and a receiver in a wireless network leads to a shift of the respective frequency, commonly due to the Doppler effect. The requesting user equipment measures the frequency shift of the incoming signals of neighbouring devices and accomplishes the categorization process as a function of the measured values. This provides the advantage that this approach does not require any additional signalling.

Secondly, a transmission of information concerning the own category regarding the requesting device can be accomplished. The requesting device may transmit device identification providing the respective device category, also referred to as communication profile. The end device may for instance indicate that it is attached to a traffic sign or traffic lights, which are location static. The provided information may also indicate that the communication profile corresponds to a mobile end device, a car navigation system and so on. The location property can also be read out from the provided information, which may provide the current direction of movement, for example "north-west". This provides the advantage that additional information can be provided, which leads to a further optimization of the connection. Furthermore, the location property can be read out from the provided information and does not need to be measured.

Thirdly, the categorization can be performed by transmission of information about the relevant service providing devices. This may also be referred to as the relevant target group. A user equipment may be mounted on a traffic sign or an overhead sign gantry and transmits the information specifying its target group for instance by specifying that only end devices moving in a specific direction are potential service requesters. Such a target group can also be specified by a specific type of vehicle or for vehicles transporting dangerous goods. A further restriction of the target group can be accomplished by a directed transmission for instance of a location static traffic sign in the direction of bypassing relevant cars. This approach provides the advantage that additional and predefined information can be provided and is especially suitable for senders which regularly communicate with several receivers, such as in a broadcast or multicast mode.

It may also be of advantage to combine aspects of the provided approaches for accomplishment of a categorization.

By means of the categorization the connection and therefore the transmission of the requested data can be optimized concerning the properties of the underlying category. As the category is determined a priori to the establishment of the connection the optimization can be applied for establishment of the connection as well as during the communication and transmission process itself. The optimization can for instance be accomplished regarding a channel coding, a source coding or a modulation.

A communication between devices moving in the same direction can be accomplished without special controlling measurements, such as the introduction of unused time slots for considering different delay times, also referred to as guard regions, and can be operated with a high bandwidth. In case one device passes a location static further device an optimization towards a short connection regarding time can be accomplished. In case communication devices are moving in the respectively opposite direction an even shorter connection time can be presumed and the respective connection can be optimized towards this situation. It may be of advantage to predefine a relative small number of messages, such as four to sixteen, which can be expected by the receiving device. One usage scenario is a first predefined message indicating that a danger zone lies 10 kilometres ahead, a further message indicating that a danger zone lies 1 kilometre ahead or that a danger zone lies 100 meters ahead and so on. For transmitting these different messages only two bits are required for which the transmission can easily be performed robustly with regard to the effects of a fast changing mobile radio channel but with a relatively short transmission time.

Furthermore the categorization allows the service requesting end device to evaluate the potential communication partners regarding their capability for providing a service or for establishing a specific connection. Hence, appropriate or non-appropriate communication partners are detected and distinguished.

Furthermore, the categorization can be useful for the selection of an appropriate type of communication. Each type of connection brings about a specific effort for establishing a connection. In the following, communication types are presented in the order of their required effort. Only little effort for establishing a connection is required in a broadcast mode, which refers to the transmission of information to all end devices being in the respective transmission range. The multicast mode implies a transmission of information to only a group of receiving devices in the transmission range. Besides a one-to-one connection an ad-hoc network may be appropriate. An ad-hoc network is a network comprising at least two subscribers wherein each end device provides information such as its identity, its communication capabilities and provided services as well as requested information and services upon the entry of the network.

According to the present invention communication and establishment of connections, which is not required can be prevented. In case a gaming service is requested from one to another end device moving in opposite directions the establishment of a connection can be prevented or at least be cancelled. Information of high priority such as traffic information, can be transmitted over an optimized connection regarding a short transmission. The attempt to communicate with specific devices, which are not providing respective capability, such as adapted traffic signs, is prevented by the transmission of a device identification. It may furthermore be the case to jointly decide whether a type of connection is feasible and negotiate such a decision between two end devices. In an alternative approach, which uses single parameters with individual thresholds may lead in many cases to different decisions among several end devices, which need to negotiate if they are enabled for mutual communication. In case they decide so they communicate via an ad-hoc mode or a direct mode. The usage of categories may also be supported by transmission of an own category, wherein the category can be measured as well in receiving devices. The usage of the Doppler frequency is one possible example.

According to a further aspect of the present invention the communication profile is arranged to provide a priority information indicating that a connection is established independently of the respective transmission parameters. This provides the advantage that in case highly important traffic information or emergency information is attempted to be transmitted even if inappropriate transmission parameters are detected.

According to a further aspect of the present invention the measurement device is arranged to measure several location properties in accordance with a provided measuring schedule. This provides the advantage that several location properties can be analysed and a direction of movement or a velocity can be derived. Such derived further information can be used for selecting specific communication profiles.

According to a further aspect of the present invention at least one of a group of further detected parameters is considered for communication profile selection the group comprising transmission capabilities of a user equipment, a user equipment ID, a transmission resource allocation and a status information of a user equipment. This provides the advantage that along with the measured location properties additional detected properties can be used, which means that the location properties can be read out from further information provided by either the service requesting device or the service providing device.

According to a further aspect of the present invention transmission parameters describe at least one of a broadcast mode, a multicast mode, a direct device-to-device communication and an ad-hoc mode, a channel coding, a source coding and a modulation of the transmission. This provides the advantage that based on the selected communication profile a specific mode is selected which is directly tailored to the very specific situation of the requested communication.

According to a further aspect of the present invention the measurement device is arranged to perform location detection in accordance with one of a network-based technique, a handset-based technique, a SIM-based technique, a cell-based technique and a hybrid technique. This provides the advantage that also legacy systems for location determination can be used.

In a network based technique the end devices are located under usage of the service providers' network infrastructure network based location techniques comprise a cell identification and a trianguiation by means of several base stations. A handset based location technology may require cell identification or further hardware and/or software components, for instance a GPS device. SIM based location techniques comprise the measurement of serving cell IDs, a round trip time and signal strength. Furthermore, WIFI techniques can be applied, which make use of several routers and an evaluation of the respective signal strength of each router. Hybrid techniques make use of several aspects of the aforementioned techniques.

According to a further aspect of the present invention the measurement device is connectively coupled to a storage device providing the communication profiles. This provides the advantage that several communication profiles can be defined a priori to an establishment of a connection and that the communication profiles can be dynamically updated at runtime.

According to a further aspect of the present invention a quality-of-service unit is provided, being arranged to decide if a requested service can be provided as a function of a comparison of a provided threshold with a transmission parameter. This provides the advantage that a specialized unit is provided which considers a requirement profile of a requested service and a profile of available transmission parameters.

According to a further aspect of the present invention the user equipment and the at least one further user equipment are formed by one of a mobile phone, a car navigation system, an emergency system, a car-to-car communication device, a notebook, an adapted traffic sign, a traffic information device, a gaming device, an entertainment device, a router and a tablet computer. This provides the advantage that a variety of legacy devices can be applied in a variety of application scenarios.

According to a further aspect of the present invention the location property is at least one of a group of measurement results, the group comprising a frequency shift measured between the user equipment and the at least one further user equipment, a relative velocity between the user equipment and the at least one further user equipment, an absolute velocity of the user equipment, an absolute velocity of the at least one further user equipment, a location measurement, a set of location measurements, a measurement of a movement direction, a beacon information, a location information provided by the user equipment and a location information provided by the at least one further user equipment. This provides the advantage that several location properties can be not only measured but also detected, which means that a transmitted information is interpreted and a communication profile can be selected accordingly.

According to a further aspect of the present invention the measurement unit is arranged to detect several location properties and estimate further location properties on the basis of the detected several location properties. This provides the advantage that further information can be derived from the already measured or detected information for instance by predicting a movement, a movement direction and/or a movement velocity based on a current movement behaviour.

According to a further aspect of the present invention the selected communication profile is used for an optimization of an already established connection. This provides the advantage that the present invention contributes to an establishment of a connection as well as an optimization of the further transmission process by applying communication profiles in accordance with a very specific transmission situation of the end devices.

According to a further aspect of the present invention the location property is measured at one of a service requesting user equipment and a service providing user equipment. This provides the advantage that either the movement of the service requesting unit can be considered for selection of the communication profile or the movement behaviour of the service providing device can be considered. It may furthermore be of advantage to consider both devices, which allows for a computation of a relative velocity of both communicating devices.

According to a further aspect of the present invention the transmission device is operated in accordance with one of the IEEE 802.1 1 family of standards, the LTE standard, the UMTS standard, the GSM standard, the near field communication NFC standard and the Bluetooth standard. This provides the advantage that the user equipment can be operated according to well established communication standards using legacy systems and protocols.

The object is also solved by a method in a user equipment for selecting a transmission mode as a function of at least one location property. The method comprises selecting a communication profile of at least one further user equipment out of provided communication profiles as a function of at least one detected location property, wherein each communication profile defines a set of transmission parameters. The method furthermore comprises evaluating if the respective transmission parameters allow for providing a requested service. In additional steps the method comprises establishing a connection to the at least one further user equipment in accordance with the selected communication profile in case the respective transmission parameters allow for providing the requested service.

BRIEF DESCRIPTION OF THE DRAWINGS

The invention will now be described merely by way of illustration with reference to the accompanying drawings in which.

DETAILED DESCRIPTION

In the following the same reference signs will be used for the same features if not indicated otherwise. For ease of use the user equipment UE are denoted with a numbering which does not imply that always the same user equipment are involved in the following embodiments.

Figure 1:
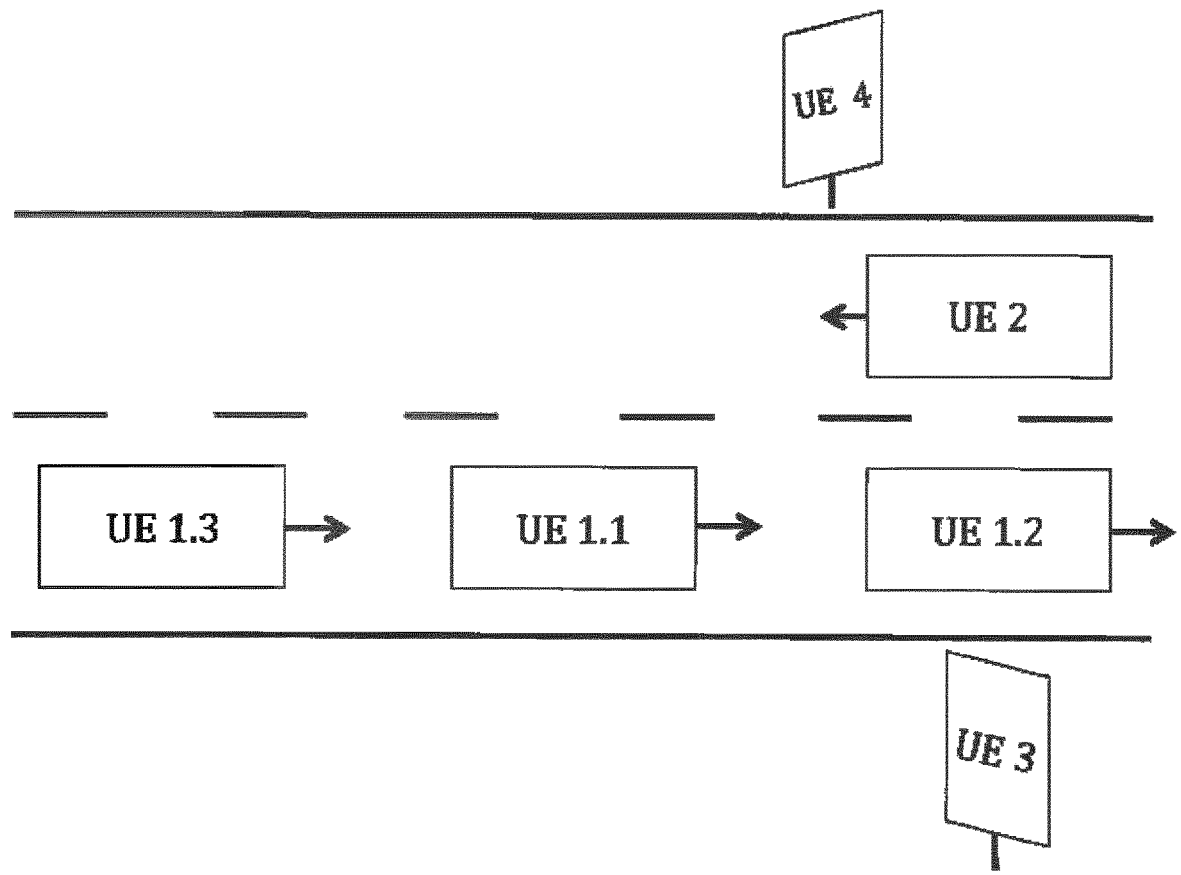
FIG. 1 shows a usage scenario of an aspect of the present invention.

FIG. 1 shows in one aspect of the present invention six end devices, being defined according to predefined categories, in the following selecting device profiles by means of location property profiles is presented. As an example detected location properties are named 'current-speed' and 'abs-direction' (for absolute direction). Also further types of properties can be considered, such as 'Device type'. On the basis of this information an appropriate communication profile can be selected. The respected communication profile can then be used for establishment of a connection according to the specific device movement. The end devices can furthermore indicate a requested service, such as 'lane-status', which registers a device for the reception of the traffic information regarding a lane status.

User Equipment UE 1.1 is mounted on a truck and sends its category by means of a broadcast/beacon:
Device Information:
  Device Type-'Truck'
  Communication Type='Traffic-Info-Sink', 'Traffic-Info-Repeater'
Mobility information:
  current-speed='mid>80 km/h',
  abs-direction-'east'
Relevant-Info={'lane-status'}

User Equipment UE 1.2 is installed in a car and does not send its category. It does provide a beacon providing its identity to indicate the readiness to communicate. It travels with a speed of 100 km/h in a specific direction.

User Equipment UE 1.3 is installed in a truck and transmits its category by broadcast beacon:
Device Information:
  Device Type='Truck'
  Communication Type='Traffic-info-Sink', 'Traffic-info-Repeater'
Mobility Information:
  current-speed-'mid>80 km/h',
  abs-direction='east'
Relevant-Info={'lane-status'}

User Equipment UE 2 is installed in a car and does not send its category but provides a beacon with its ID. It travels into the opposite direction compared to User Equipment UE 1.1, User Equipment UE 1.2 and User Equipment UE 1.3 at a speed of 200 km/h User Equipment UE 3 is formed by a traffic sign and provides its categories by means of a broadcast/beacon:
Device Information:
  Device Type-'traffic control sign'
  Communication Type='Traffic-Info-Source', 'General-Info-Source'
Mobility Information:
  'fixed'
Relevant-Driving-Direction: East User Equipment UE 4 is formed by a traffic sign and provides its categories by means of a broadcast/beacon:
Device Information:
  Device Type-'traffic control sign'
  Communication Type='Traffic-Info-Source', 'General-Info-Source'
Mobility Information:
  'fixed'
Relevant-Driving-Direction: West In the following an aspect regarding the selection of an appropriate transmission mode, such as encoding and modulation, is provided. The user equipment UE 1.1, user equipment UE 1.2 and user equipment UE 1.3 are moving in the same direction and are therefore part of a first category. Therefore, it can be estimated that a longer transmission period is available and an optimization towards this scenario regarding the duration as well as the encoding of the data can be performed. User equipment UE 2 belongs to a second category, moving in the opposite direction, which is indicated by a respective arrow. Hence, only an extremely short period of time is available for data transmission between one of the user equipment UE 1.1, UE 1.2 and UE 1.3 towards the further user equipment UE 2. The amount of data to be transmitted as well as the encoding needs to be adapted accordingly. UE 3 belongs to a third category because it is location static providing information which is only relevant for those end devices moving in the same direction as the user equipment UE 1.1, UE 1.2 and UE 1.3. The user equipment UE 4 belongs to a fourth category because it is location static and its information is only relevant for end devices moving in the direction of user equipment UE 2.

According to a further aspect of the present invention a selection of the type of communication is performed. On the basis of a provided category being transmitted via a beacon the user equipment UE 1.1 as well as UE 1.3 decides to establish an ad-hoc network for sharing relevant traffic information. Furthermore, both devices can share information for establishing a communication connection between cars, such as a convoy, or for establishment of a speech transmission. The decision criteria for establishment of such an ad-hoc network is that both devices or vehicles are traveling at a similar speed and therefore are connected over a longer period of time and furthermore share the same interests and communication requirements as both devices may be of the same vehicle type, such as both being trucks. The additional effort arising from the establishment of a connection is compensated in this case by the longer communication period in this example.

In a further aspect of the present invention traffic information is forwarded or passed on. The first user equipment UE 1.1 or UE 1.3, which receives the signal of the traffic information system UE 3 connects to the traffic information system UE 3 and establishes a connection. The received information as far as being comprised in the category 'traffic-info-repeater' is shared with the members of the ad-hoc network. By means of a cascading of several end devices of the category 'traffic-info-repeater' within the ad-hoc network the traffic information can be repeatedly shared among members of the ad-hoc network and the transmission range of the traffic information system is indirectly increased.

According to a further aspect of the present invention the establishment of a connection to inappropriate communication partners is denied. The user equipment UE 1.1 receives beacons from UE 2 and UE 1.2 and determines the respective Doppler frequency or the relative velocity. In this embodiment a relative velocity for UE 2 may be 280 km/h and for UE1.3 the relative velocity may be 20 km/h. In case a threshold of 25 km h is configured for identification of an appropriate direct communication the user equipment UE 2 is identified as an inappropriate communication partner of UE 1.1. The user equipment UE 1.2 is a potential communication partner to which a connection can be established.

Figure 2:
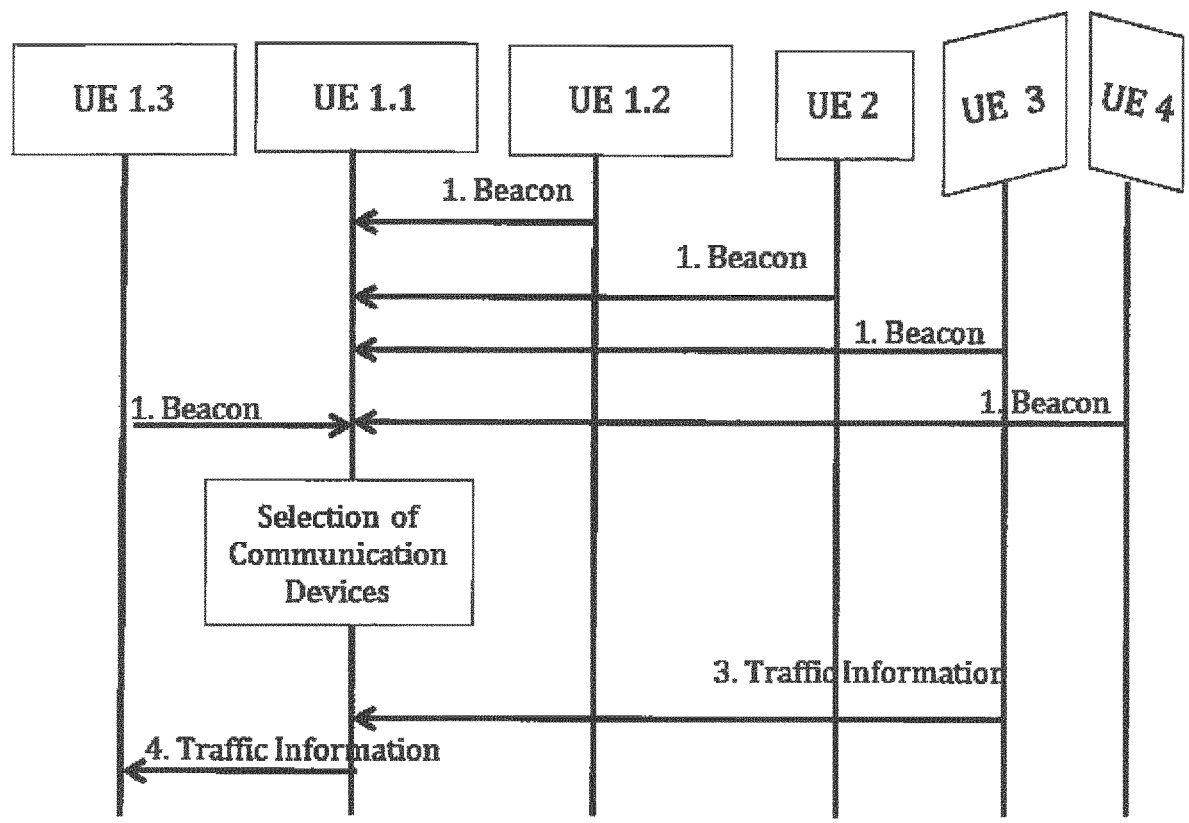
FIG. 2 shows a flow chart specifying a method for selection of a communication profile as well as a selection of a communication device according to an aspect of the present invention.

FIG. 2 shows a message flow diagram describing the selection of a communication profile by means of beacon evaluation. The flow chart specifies the scenario as being described by text passages referring to FIG. 1. In the present aspect of the invention the user equipment UE 1.1 is mounted on a truck which is moving with a traveling speed of 80 km h on a highway. The vehicle is equipped with a traffic information system, which can be accessed by neighbouring vehicles and adapted traffic signs, for instance traffic signs of a traffic information system, and can receive data via direct communication and furthermore evaluate and forward that data. In the following an evaluation of potential communication partners for reception and forwarding of traffic information by means of beacons is described.

The user equipment UE 1.1 drives along a highway. Behind this user equipment a further user equipment UE 1.3 is located which is a truck as well. The user equipment UE 1.3 transmits its properties, such as 'kind=truck', in a specific frequency by means of beacons. The user equipment UE 1.1 is configured to monitor for devices communicating traffic information and looks for transmitted beacons. It receives the beacons transmitted from user equipment UE 1.2, which may be a car in front of it, the user equipment UE 1.3, which may be the truck behind it, the user equipment UE 2, which may be the car on the opposite side of the highway, and furthermore from user equipment UE 3 as well as UE 4. The user equipment UE 1.1 now categorizes said devices as a function of the beacons.

A result of that categorization may be that user equipment UE 1.2 is not appropriate for exchange of traffic information because no category information is sent. User equipment UE 1.3 is a potential communication partner for the exchange of traffic information. The user equipment UE 2 is an inappropriate device regarding the exchange of traffic information because no category information is sent. The user equipment UE 3 is identified as a sender or a source of traffic information, which is relevant for the current driving direction. The user equipment UE 4 is a sender or source of traffic information, but is not relevant for the current driving direction.

The user equipment UE 1.1 decides to receive traffic information from user equipment UE 3 because this information is relevant for the current driving direction. Furthermore it decides to receive traffic information and in case it is presented further traffic information, for instance information being detected with further means such as collected information provided by an onboard front camera, it transmits that information to the user equipment UE 1.3. Therefore an ad-hoc network is established together with user equipment UE 1.3. In further steps the user equipment UE 1.1 receives traffic information from user equipment UE 3 and the user equipment 1.1 establishes an ad-hoc network with user equipment UE 1.3 and sends traffic information to the user equipment UE 1.3.

Figure 3:
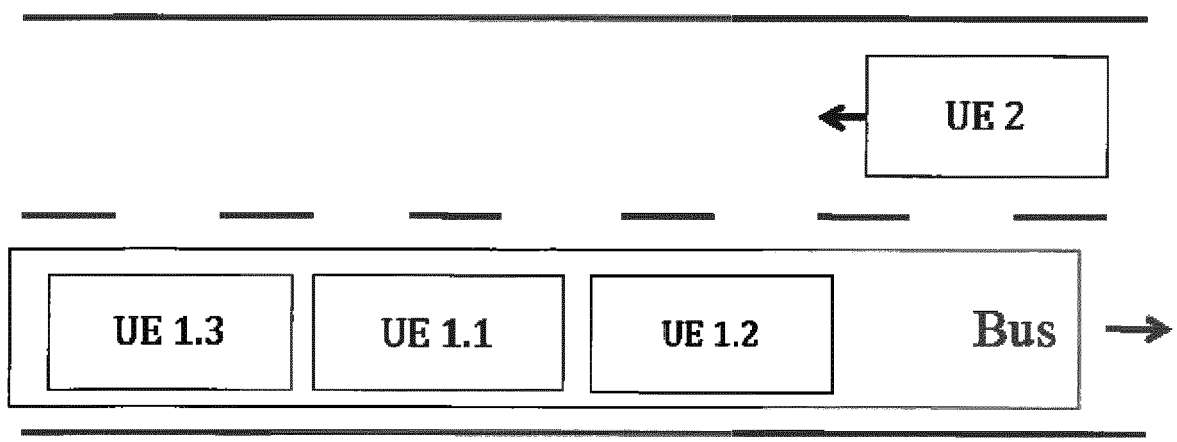
FIG. 3 shows a further usage scenario of an aspect of a communication partner selection system according to the present invention.
Figure 4:
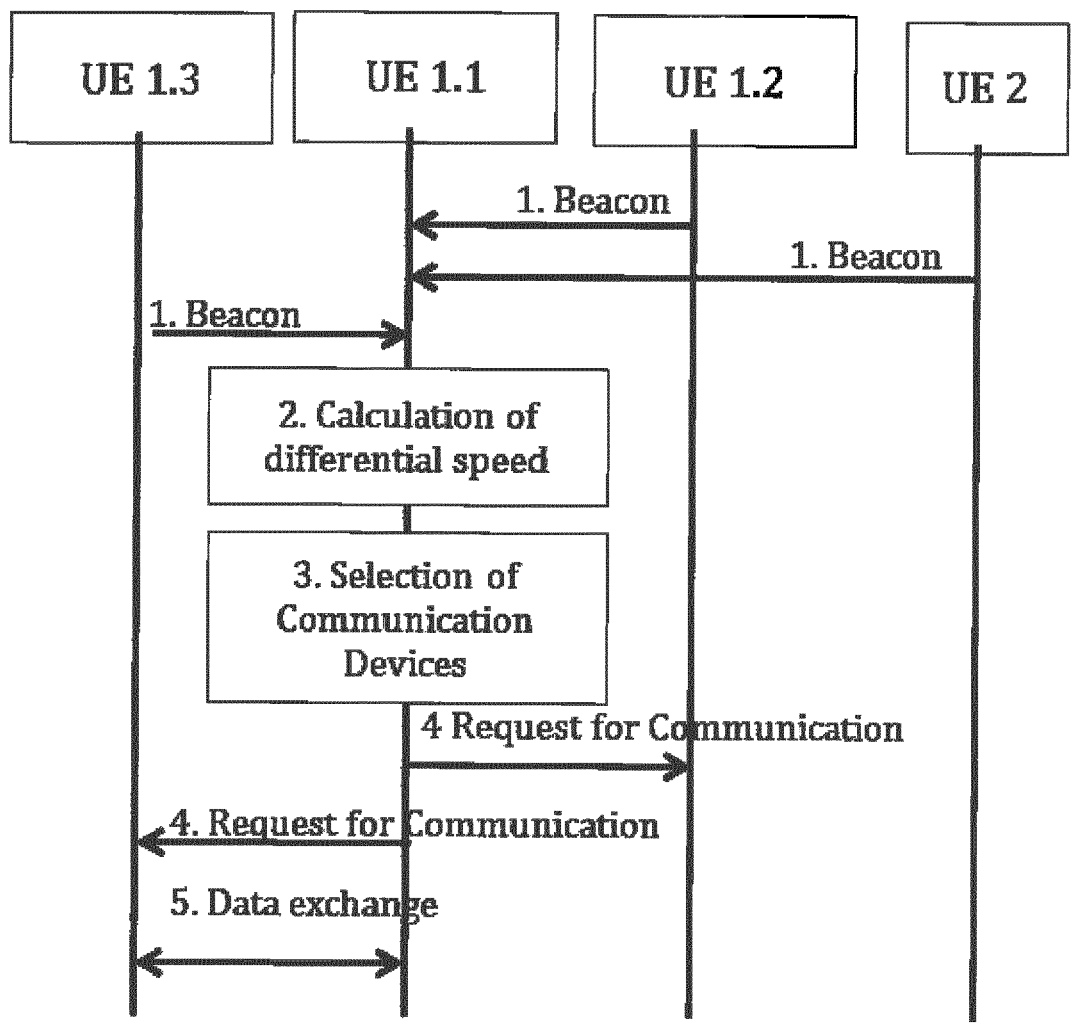
FIG. 4 shows a further flow chart specifying a method for selection of a communication profile as well as a selection of a communication device according to a further aspect of the present invention.

In the following the applications scenario being proved by FIG. 3 as well as the respective flow chart being provided by FIG. 4 is described. In the present aspect of the invention a selection of the communication profile is performed under usage of the Doppler frequency. According to an aspect of the present invention the communication partner is selected on the basis of a method for estimation of the Doppler frequency as well. Referring to FIG. 3 several user equipment UE 1.1, UE 1.2 and UE 1.3 are located within a bus which is travelling at a speed of 80 km/h. A further end device UE 2 drives on the same street but in an opposite direction with a velocity of 120 km/h. The user operating the user equipment UE 1.1 decides to play a game and launch a gaming session with a further player in close proximity.

Hence, the further steps can be accomplished for selecting an appropriate communication partner. User equipment UE 1.1 scans for beacons being transmitted by further devices in its proximity and receives beacons from user equipment UE 1.2, UE 1.3 as well as UE 2. The user equipment UE 1.1 uses the received signals for computation of a relative velocity of the devices. This may be 0 km/h for UE 1.2; 0 km/h for UE 1.3 and furthermore 200 km/h for UE 2.

The user equipment UE 1.1 is configured such that only devices with a relative velocity below 3 km/h are considered for the requested service, namely gaming. This value can be different for different communication types and provided services. A critical emergency message may even be transmitted in case of a very high relative velocity. Traffic information of normal priority may be transmitted at a relative velocity below 20 km/h. Communication regarding speech may be feasible at a relative velocity below 20 km/h and a gaming session can only be started at a relative velocity below 3 km h.

In this case the user equipment UE 1.2 and UE 1.3 are selected as appropriate communication partners and UE 2 is not considered due to its high relative velocity. Hence, user equipment UE 1.1 sends a request for establishment of a connection to the previously selected devices, namely user equipment UE 1.2 as well as user equipment UE 1.3. The further user equipment UE 1.2 does not attempt to establish a connection. It may transmit a cancelling message or it does not reply at all. The user equipment UE 1.3 is interested in the establishment of a connection and the connection is successfully established after all.

Figure 5:
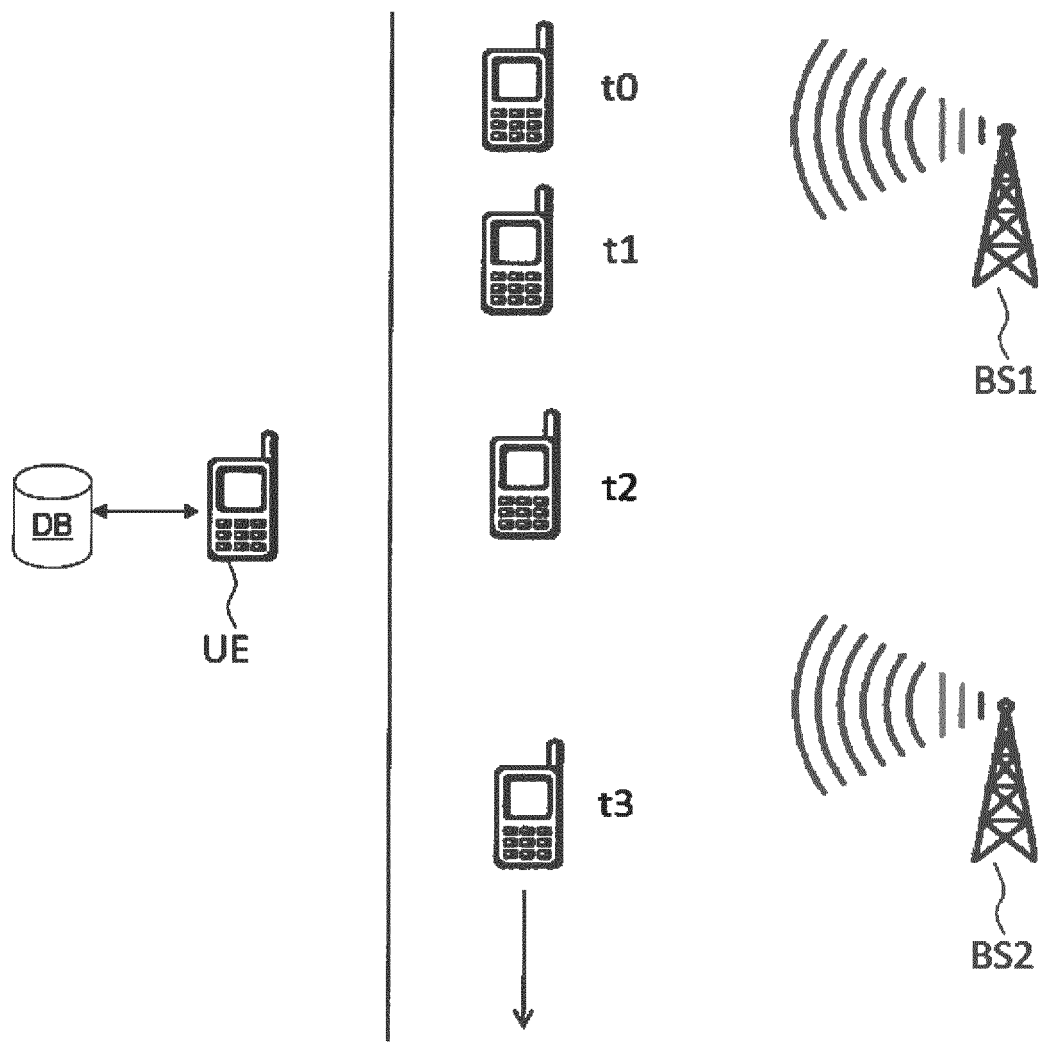
FIG. 5 shows a further method for selection of a communication profile according to a further aspect of the present invention.

FIG. 5 shows a further usage scenario of an aspect of the present invention. According to the present aspect of the invention a first user equipment UE may be location static, while the following also applies in case of a moving user equipment UE into a certain direction. It is connected to a data base DB which provides predefined communication profiles which can be selected for transmission towards a further user equipment being depicted on the right hand side of the first user equipment UE. The first user equipment on the right hand side travels in the direction of the indicated arrow. As location property information is measured by the user equipment UE at the points of time T0, T1, T2, . . . . Tx it is possible to derive a movement direction as well as a velocity of the further user equipment. As the distance between the measurement points T0, T1, T2 and T3 increases and the measurement time points are equally distributed it is furthermore possible to derive a location property information stating that the user equipment accelerates. This specific aspect is not bound to a specific location determination technique. It may be of advantage to use a GPS signal for measuring the location at the specific points in time. It may further be of advantage to locate the further user equipment by means of a subscription to a first base station BS1 and furthermore by a handover and further subscription to base station BS2. In this fashion the user equipment UE can determine a specific communication profile of the accelerating further user equipment and derive further movement behaviour of the potential communication partner. In case no appropriate communication partners are retrieved over a longer period of time the user equipment UE may adapt the connection metric for retrieving appropriate communication profiles. Hence, the communication profiles being provided by the data base DB can be adapted at runtime.

Figure 6:
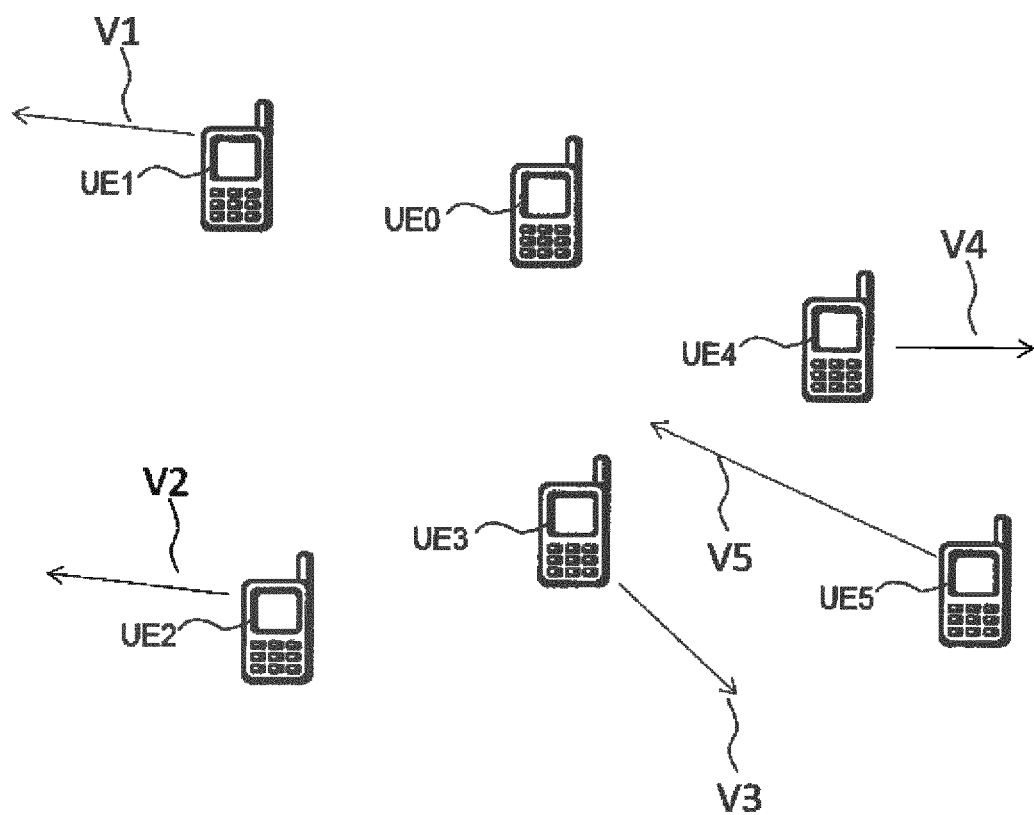
FIG. 6 shows a further method for selection of a communication profile as well as a selection of a communication device according to a further aspect of the present invention.

FIG. 6 shows a further usage scenario of the present invention, in which user equipment UE 0 evaluates the location properties of further user equipment. The user equipment UE 0 requests a service and now looks for a service provider among the user equipment in proximity. As mentioned before the user equipment UE 0 is arranged to evaluate movement behaviour of further end devices and is therefore able to compute a movement vector for each of the end devices. Hence, the user equipment UE 0 may identify that a first user equipment UE 1 is travelling away from UE 0 in the direction of the vector V1. It may furthermore recognize that a user equipment UE 5 is far away but approaches at a high velocity according to the respective vector V5. Hence, the user equipment UE 0 may select a communication profile with respective transmission parameters which chooses the user equipment UE 5 as a potential communication partner although it is more distant than for instance the user equipment UE 1. Hence, a selection metric is established which does not only recognize the current proximity of a further user equipment but derives further movement behaviour, specified by a vector, and is therefore able to establish a connection with appropriate features. As the user equipment UE 5 travels at fast speed and is rapidly approaching optimal transmission settings are to be presumed, which are only of short duration. Hence, an appropriate connection can be established between the user equipment UE 0 and the further user equipment UE 5. Furthermore, the user equipment UE 0 needs to evaluate if a requested service can be provided by the fast moving user equipment UE 5. If this is the case an optimized connection can be established between both devices and the requested service can be provided.

The person skilled in the art appreciates further ways to implement the subject matter of the present invention. The described methods can for instance be accomplished by respective telecommunication protocols and can be stored on at least one storage medium by means of storing instructions for performing the method steps. Several of the suggested user equipment can be operated to jointly provide a telecommunication system, if necessary under communication with further network devices.

The invention claimed is:

1. A method performed by a first user equipment device for establishing a communication with at least one second user equipment device, the method comprising:
   receiving beacon signals from the at least one second user equipment device, the beacon signals providing location information concerning the at least one second user equipment device;
   obtaining the location information from the beacon signals, either directly from the beacon signals or by measuring a property of the beacon signals;
   using the beacon signals to derive a velocity measurement of the at least one second user equipment device;
   performing a categorization by assigning the at least one second user equipment device to one or more categories using the velocity measurement;
   selecting one or more of the at least one second user equipment devices as a communication partner using the categorization;
   determining a communication mode to be used for communication with the communication partner from a set of possible communication modes using a function of the location information concerning the at least one second user equipment device obtained from the beacon signals, wherein the determining is performed in advance of establishing a connection with the communication partner.

2. The method of claim 1, wherein the location information of the beacon signals comprises at least one of device information, mobility information and relevancy information.

3. The method of claim 1, wherein the property of the beacon signals is a relative velocity between the first user equipment device and the at least one second user equipment device.

4. The method of claim 1, wherein the communication mode is selected from the list of a broadcast mode, a multicast mode, a direct device to device communication mode and an ad hoc network mode.

5. The method of claim 1, wherein the communication is established only if the property of the beacon signals is below a given threshold.

6. The method of claim 5, wherein the property of the beacon signals is a relative velocity between the first user equipment device and the at least one second user equipment device.

7. The method of claim 1, wherein a transmission parameter for the communication is selected using information determined from the received beacon signals.

8. The method of claim 7, wherein the transmission parameter includes at least one of channel coding, source coding and modulation of the transmission.

9. The method of claim 7, wherein the transmission parameter is selected using the categorization.

10. The method of claim 7, wherein the location information concerning the at least one second user equipment device is obtained prior to connection setup.

11. The method according to claim 1, wherein the velocity measurement is a measurement of a relative velocity between the first user equipment device and the at least one second equipment device.

12. The method according to claim 11, wherein the relative velocity is measured using a Doppler frequency shift of the beacon signals.

13. A first user equipment device for establishing a communication with at least one second user equipment device, the user equipment device being arranged to:
   receive beacon signals from the at least one second user equipment device, the beacon signals providing location information concerning the at least one second user equipment device;
   obtain the location information from the beacon signals, either directly from the beacon signals or by measuring a property of the beacon signals;
   use the beacon signals to derive a velocity measurement of the at least one second user equipment device;
   perform a categorization by assigning the at least one second user equipment device to one or more categories using the velocity measurement;
   select one or more of the at least one second user equipment devices as a communication partner using the categorization; and
   determine, in advance of establishing a connection with the communication partner, a communication mode to be used for communication with the communication partner from a set of possible communication modes using a function of the location information concerning the at least one second user equipment device obtained from the beacon signals.

14. The first user equipment device of claim 13, wherein the location information of the beacon signals comprises at least one of device information, mobility information and relevancy information.

15. The first user equipment device of claim 13, wherein the property of the beacon signals is a relative velocity between the first user equipment device and the at least one second user equipment device.

16. The first user equipment device of claim 13, wherein the first user equipment device is arranged to select the communication mode from the list of a broadcast mode, a multicast mode, a direct device to device communication mode and an ad hoc network mode.

17. The first user equipment device of claim 13, wherein the first user equipment device is arranged to establish the communication only if the property of the beacon signals is below a given threshold.

18. The first user equipment device of claim 17, wherein the property of the beacon signals is a relative velocity between the first user equipment device and the at least one second user equipment device.

19. The first user equipment device of claim 13, wherein the first user equipment device is configured to select a transmission parameter for the communication using information determined from the received beacon signals.

20. The first user equipment device of claim 19, wherein the transmission parameter includes at least one of channel coding, source coding and modulation of the transmission.

21. The first user equipment device of claim 19, wherein the first user equipment device is configured to select the transmission parameter using the categorization.

22. The first user equipment device of claim 13, wherein the first user equipment device is configured to obtain the location information concerning the at least one second user equipment device prior to connection setup.

* * * * *